United States Patent [19]

Song

[11] Patent Number: 4,880,233
[45] Date of Patent: Nov. 14, 1989

[54] GAME BALL

[75] Inventor: Chul-Ho Song, Seoul, D.P.R. of Korea

[73] Assignee: Seoul Nassau Corporation, Seoul, Rep. of Korea

[21] Appl. No.: 253,081

[22] Filed: Oct. 3, 1988

Related U.S. Application Data

[63] Continuation of Ser. No. 9,266, Jan. 30, 1987, abandoned.

[30] Foreign Application Priority Data

Nov. 15, 1986 [KP] D.P.R. of Korea ............... 86-9646

[51] Int. Cl.⁴ ............... B29C 27/08; A63B 37/12
[52] U.S. Cl. ............... 273/60 R; 273/DIG. 20; 273/60 B; 273/58 J; 156/60
[58] Field of Search ............... 273/60 R, 60 A, 60 B, 273/DIG. 20, 26 R, 26 D, 58 B, 58 BA, 58 K, 65 EG, 58 J

[56] References Cited

U.S. PATENT DOCUMENTS

| | | | |
|---|---|---|---|
| 2,278,649 | 8/1940 | Dickson et al. | 273/60 |
| 2,399,324 | 4/1946 | Clark | 273/60 |
| 2,753,599 | 7/1956 | Pietraszek et al. | 18/47.5 |
| 3,069,170 | 12/1962 | Dillon | 273/199 |
| 4,128,238 | 12/1978 | Newcomb et al. | 273/26 R |
| 4,149,720 | 4/1979 | Heald | 273/60 R |
| 4,257,598 | 3/1981 | Massino | 273/60 R |
| 4,286,783 | 9/1981 | Newcomb et al. | 273/26 R |
| 4,367,873 | 1/1983 | Chang et al. | 273/60 R |
| 4,462,589 | 7/1984 | Morgan | 273/60 R |
| 4,498,667 | 2/1985 | Tomar | 273/60 R |
| 4,568,083 | 2/1986 | Miller | 273/60 B |
| 4,596,389 | 6/1986 | Frankowski | 273/29 A |
| 4,598,909 | 7/1986 | Ventura et al. | 273/60 B |
| 4,653,752 | 3/1987 | Miller | 273/60 B |

FOREIGN PATENT DOCUMENTS

| | | | |
|---|---|---|---|
| 493100 | 5/1953 | Canada | 273/60 R |
| 44-35823 | 10/1971 | Japan | 273/60 R |
| 75-3088 | 4/1976 | Rep. of Korea | 273/60 R |
| 83-8339 | 5/1985 | Rep. of Korea | 273/60 R |

OTHER PUBLICATIONS

Dennis, L., "What's Happening in the Ball Market," GOLF DIGEST, p. 84, (Dec. 1980), 273-62.
Tarde, J., "How to Pick the Right Ball for Your Game," GOLF DIGEST, pp. 44-53, (Dec. 1979), 273-62.

*Primary Examiner*—George J. Marlo
*Attorney, Agent, or Firm*—Workman, Nydegger & Jensen

[57] ABSTRACT

A cover replicating the appearance, texture, and surface features of a regulation baseball enclosing a flexible, hollow, spherical core. The core is fabricated from a pair of substantially similar semispherical shells made of a homogeneous, waterproof composition and bonded one to another at the circumferential edges. The composition from which the core is formed includes by weight 30-40 percent styrene butadiene rubber, 16-20 percent natural rubber, 33-37 percent calcium carbonate, and 5-9 percent silica powder, as well as diphenyl guaniden, rubber cure accelerator, and traces of zinc oxide and sulfur. The outer diameter of the core is approximately 2.6-3.0 inches with a wall thicknesses in the range of approximately 0.08-0.16 inches. The core with the cover assembled thereon has a weight of approximately 2.5-3.5 ounces, less than that of a regulation baseball, and an outer diameter substantially equivalent thereto. The cover includes two pieces of synthetic leather secured at the edges with raised herringbone stitching in the pattern of a regulation baseball. Optionally, a layer of twine may be tightly wound in random fashion about the core and the outer cover may be adhered to the structure beneath it using an adhesive. Due to its flexibility and lighter weight in relation to a regulation baseball, the disclosed substitute baseball affords an enhanced margin or safety to young and inexperienced players.

13 Claims, 2 Drawing Sheets

GAME BALL

RELATED APPLICATIONS

This application is a continuation of U.S. patent application No. 07/009,266 filed Jan. 30, 1987, now abandoned.

BACKGROUND OF THE INVENTION

1. Field of the Invention

This invention relates in general to recreational game balls. More particularly, the invention pertains to the games of softball and baseball and the type of game balls that may be substituted for those required for the rules of softball or baseball in order to enhance safety during training or informal play.

2. The Problem

Safety, performance, and durability are three extremely important considerations when selecting a baseball or similar recreational ball, particularly for training and practice purposes. Usually safety is sacrificed for performance and/or durability, but game balls have also been constructed in which safety has been emphasized at the expense of performance and durability.

A standard or regulation baseball, sometimes called a "hardball," weighs approximately 5 ounces (143 grams) and has a circumference of about 9 inches (22.9 centimeters). Regulation baseballs are composite ball constructed of a cork and rubber core around which yarn is wrapped and a leather cover sewn. Virtually everyone who has ever played with a regulation baseball is well aware of the reason for referring to it as a "hardball." The hardness of regulation baseballs, in fact, poses very substantial safety and training problems.

A so-called "softball" is in fact a baseball of larger diameter than a regulation baseball, but a ball that is still quite hard. Regulation softballs come in five sizes, with the approximately 12 inch (30.5 centimeter) circumference ball being most widely used, the 16 inch (40.6 centimeter) circumference ball gaining in acceptance, and use, and 10 inch (20.5 centimeter), 11 inch (27.9 centimeter), and 14 inch (35.6 centimeter) circumference softballs used to a lesser degree. While the density of softballs is less than that of a hardball, softballs still pose safety problems as well as training problems, particularly for younger players.

Both regulation baseballs and softballs are covered with a leather cover that is formed from two pieces that are sewn together by hand with herringbone stitching. The stitching tends to form ridges which affect the aerodynamics of the balls and facilitate the throwing of pitches which break, curve, or slide during their trajectory. The associated appearance, texture, and surface features, while desirable in any substitute game ball, have not reliably been recreated in embodiments of substitutes having enhanced safety as an objective. Thus the appearance, feel, and aerodynamic behavior of substitutes is one area of performance that has been degraded in substitutes in order to achieve enhanced safety.

The importance of having both safety and performance in any substitute softball or baseball can futher be illustrated by making reference to the training techniques used by professional athletes who spend many hours in team and individual practice seeking to refine their skills and develop confidence. Conventionally, such training has utilized regulation baseballs and softballs, which exposes the players to considerable risk of being hit and seriously injured by batted or thrown balls. As a result, players are ever alert to the possibility of being hit by balls, which tends to build tightness instead of confidence.

Foul tips and wild pitches are responsible for numerous broken fingers, thumbs, noses, and other injuries, and yet a catcher needs to practice holding on to foul pitches and catching pitches in the dirt. Pitchers must practice fielding, and yet their close proximity to the batter results in serious injuries every year from batted balls. Crushed cheek bones, chipped teeth, concussions, and eye injuries can and do occur to pitchers during practice sessions, as well as games. Runners get hit with batted balls and thrown balls while practicing base running. Infielders must endure bad hops, poor throws, and line drives, and outfielders will lose balls in the sun or have them blown in the wind. All batters must learn to stand in the batter's box against curves and sliders, mixed with 90 mile per hour and faster fast balls. Bruised arms, legs, and feet and concussions are predictable occurrences.

These dangers are present from the major leagues down to sandlot and little league play. In lower levels the balls tend to travel somewhat more slowly, but the player skills are substantially less, making the risk of injury, even during training or practice, still quite significant.

Furthermore, actual injuries and the fear thereof have a profound impact on the ability of younger players to relax and learn the game. In numerous instances, the potential risk of being hit by thrown and batted balls leads many beginners to shun the sport.

Major league, college, high school, and even little league players must have a training ball that has performance characteristics which are close enough to that of a regulation ball so that the time spent in training will build usable skills, rather than lulling the player into developing poor habits which will not suffice under game conditions with a regulation ball. For this reason any safety motivated substitute baseball or softball should optimally have performance characteristics that make it useful as a training tool for skilled as well as unskilled players. Such balls should not sail when pitched hard because of their light weight; they should have realistic and reproducible rebound characteristics; and they should have adequate durability so as to maintain their shape and resiliency during normal use, particularly when repeatedly used for batting practice. Deterioration should not be exacerbated by water, which is predictably present during the use of the balls outdoors, and the weight and rebound characteristics of the substitute should not be susceptible to variation due to easy absorption of moisture by the cover and internal materials.

Apart from the training potential afforded by an acceptable substitute baseball of softwall, some circumstances call for a recreational game ball that is safer than a regulation baseball of softball. At the commonplace family or office picnic, for example, pickup baseball games occur in which the skill levels vary widely among the participants. Such games are usually played on uneven fields, often confined in area. Few gloves are available for use by the players in the field. Play with a baseball in such situtations is imprudent because of the risk of injury, and even with a softball, it is not infrequent that players will be injured during play due being hit by the ball.

Poor weather often forces the play of ball sports indoors, for example, into a gymnasium. The risk of property damage in confined indoor areas from baseballs and softballs has largely relegated the use of gyms to ball sports such as basketball, volleyball and similar sports. Window breakage, abrasion and scuffing of floors and destruction of wallboard, light fixtures, and other property is almost certain to occur if a regulation baseball is used indoors. Insurance premiums for gymnasiums in which baseball practices are regularly held are higher as a result of the risk of physical property damage. Additionally, the risk of player injury increases dramatically as a result of the closer proximity of the players to each other and the hardness of the surfaces from which a ball in play can rebound.

While it cannot be expected that a safe substitute baseball of softball will ever replace regulation baseballs or softballs, because hardness is part of the regulation game, a safety ball can and should have sufficiently lively performance characteristics so as to enable the play of baseball-like games that are challenging, competitive and fun. The substitute, however, must not be a "jackrabbit" ball that rebounds off playing surfaces unrealistically. Younger players, for example, can learn much about the game of baseball and basic skills by playing competitive baseball games with a realistically performing, safety baseball or softball.

PRIOR ATTEMPTS AT A SOLUTION

An extremely soft, cellular plastic foam ball is marketed under the trademark NERF for simulated play and the training of the young. NERF recreational balls, however, being formed from open cell foams are extremely light in weight and have unrealistic dynamic characteristics. In addition they are rather flimsy, absorbent of moisture, and are not intended to be used by advanced baseball players for serious practice or training.

Another attempt to provide a safe, high performance, durable substitute ball has employed a cork and rubber core similar, so but softer than, the type used at the center of a regulation baseball. This core is wrapped in yarn in a manner similar to a regulation baseball. A layer of adhesive tape is added, and the ball was covered with a double knit polyester cover. This hybrid ball, marketed under the trademark TITUS II, has a weight less than that of a baseball and possess desirable safety and performance characteristics.

Nevertheless, while yarn-wrapped cores of cork and dense rubber in regulation baseballs hold their shape and integrity under repeated use and impact with baseball bats, yarn-wrapped cores of cork and soft rubber do not. Adverse environmental conditions, hasten the break-down of the matrix of the soft core. In addition, yarn-based substitute balls absorb water, increasing the ball weight and distorting performance undesirably.

Another example of a substitute game ball is that constructed in accordance with U.S. Pat. No. 4,257,598 issued to Massino. In these game balls, the rubber and cork core of a regulation baseball has been replaced by a rolled or folded cloth core which is held together by an adhesive or cohesive tape and covered by a double knit polyester cover. These are marketed under the trademark RAG BALL. The RAG BALL baseball has a weight which is approximately one-half the weight of a regulation baseball, and the RAG BALL softball has a weight which is approximately three-quarters of the weight of a regulation softball. As the cloth core of a RAG BALL composite ball is only slightly compressed, the overall ball is very soft and safe. Nevertheless, because of its structure and composition, the RAG BALL is readily distortable, easily affected by water, and rather easily destructible. In addition, the RAG BALL game ball has rebound characteristics that are significantly less lively than the balls for which it is substituted, rendering it of little value in training in fielding. Additionally the surface characteristics of a RAG BALL baseball are dissimilar from those of a regulation baseball or softball.

In an effort to enhance durability and preserve shape, sbustitute baseballs have been designed in the manner disclosed in U.S. Pat. No. 4,568,083 to Miller. In these the substitute ball is formed of a spherical plastic shell covered with the conventional sewn cover. The plastic shell is made of a thermoplastic material consisting of a mixture of ethylene vinyl acetate and "Surlyn", an ionimer made by DuPont. This material is the same as that used to cover cut-resistant golf balls. It is extremely tough and not particularly flexible. Substitute baseballs of this type find primary utility in use with pitching machines, wherein the distortion of the spherical shape of the balls used is a known problem. The resulting substitute baseball is of the same weight as, but harder than, a standard baseball, accordingly offering no increased safety to players.

Another substitute baseball, which by contrast enhances safety at the expense of durability and of dynamic performance, is that disclosed in U.S. Pat. No. 4,462,589 to Morgan. Such game balls employ a substantially closed-cell plastic form core surrounded by a waterproofing skin enclosed in a tightly knit nylon cover cut and stitched together in the pattern of a standard baseball. Such game balls are marketed under the trademark INCREDIBALL. These game balls, however soft and safe, do not accurately replicate either the appearance, texture, or surface features of standard game balls.

The texture of the cover is that of a textile, rather than leather used in the standard baseball, and because of the thinness of the nylon employed, the stitching between the components of the cover is incapable of assuming a substantiality approaching that of the herringbone stitching ridges on a standard baseball. In addition, the INCREDIBALL game ball has notable less lively rebound characteristics as compared to those of the ball for which it is substituted. Despite the provision of a waterproof skin about the foam core, the INCREDIBALL game ball readily absorbs moisture into its cover.

Accordingly, prior to the recreational game ball of the present invention, no substitute for a standard baseball or softball has both successfully increased safety to players are preserved durability, dynamic qualities, and surface characteristics.

SUMMARY OF THE INVENTION

Accordingly, it is an object of the present invention to provide a durable recreational game ball for play and training in games such as baseball and softball, which is constructed so as to substantially reduced the risk of injury to players and physical damage to property, and which has performance and surface characteristics closely simulating those of a baseball or softball.

Another object of the present invention is to provide such a recreational and substitute game ball which resists the absorption of water and will retain its shape during prolonged and repeated use.

Another object of the present invention is to provide a durable substitute baseball and softball that may be used as a training ball to build confidence and playing skills and which can be used to play recreational games by players of varying skills without protective equipment or gloves.

Still a further object of the present invention is to provide such a recreational game ball which may be used as a competitive game ball in informal settings and which is relatively easy and economical to manufacture.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with one aspect of the invention embodied and broadly described herein, a training device for use in teaching skills associated with games such as baseball and softball is provided. One embodiment comprises a resilient hollow spherical core and a flexible cover enclosing the core. The core may be made of a rubber-based compound rendering it waterproof. Optionally the core may be pressurized in relation to the atmosphere. The cover comprises two pieces of thin material textured on the outer surface thereof to resemble the outer surface of a baseball or softball and stitched one to another at the edge thereof in the pattern of such game balls. The device is typically intended to weigh less than the game ball for which it is substituted but to have an outer diameter approximately equal thereto. Optionally a layer of twine can be tightly wound in random fashion about the core. The outer cover may be bonded to the structure beneath it to enhance the integrity of the ball using a suitable adhesive.

In another preferred embodiment of the present invention, a recreational ball suitable for use in games in which a ball is thrown among players and hit with a ball is provided comprising a durable cover of synthetic rubber having a surface textured to resemble leather and a unitary waterproof core comprising a spherical shell. The outer diameter of such a recreational ball can be adjusted as desired so as to replicate either a standard baseball or any of the several varieties of standard softballs.

The game ball of the present invention is a game ball having performance and durability characteristics recommending its use as a safe training ball. The ball has surface characteristics that closely replicate the ball for which it is substituted. It retains it shape and resiliency, even under demanding and repeated use and under adverse environmental conditions, and does not suffer intolerable degradation of its performance characteristics. It will not absorb appreciable moisture. Moreover, the recreational ball of the present invention may be used by relatively unskilled players without gloves or protective equipment, even indoors, with little or no risk of injury to players or risk of physical damage to property. Finally, the safety ball of the present invention has performance characteristics enabling it to be used as a game ball for the play of competitive games requiring substantial skill and can be produced in several sizes including baseball and softball sizes.

BRIEF DESCRIPTION OF THE DRAWINGS

The invention will be described with additional specificity and detail through the use of the accompanying drawings in which.

DESCRIPTION OF THE PREFERRED EMBODIMENT

The game ball of the present invention as generally described and illustrated in the figures herein could be constructed using any number of acceptable methods in a wide variety of different configurations. Thus, the following detailed description of presently preferred embodiments of the invention is but illustrative to the nature of the invention and is not intended to limit the scope thereof.

Figure 1:
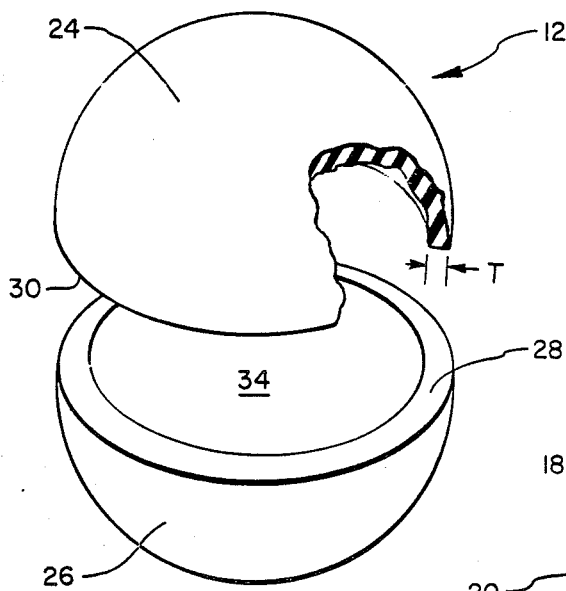
FIG. 1 is a perspective exploded view in partial section of a spherical core suitable for use in the game ball of the present invention.
Figure 2:
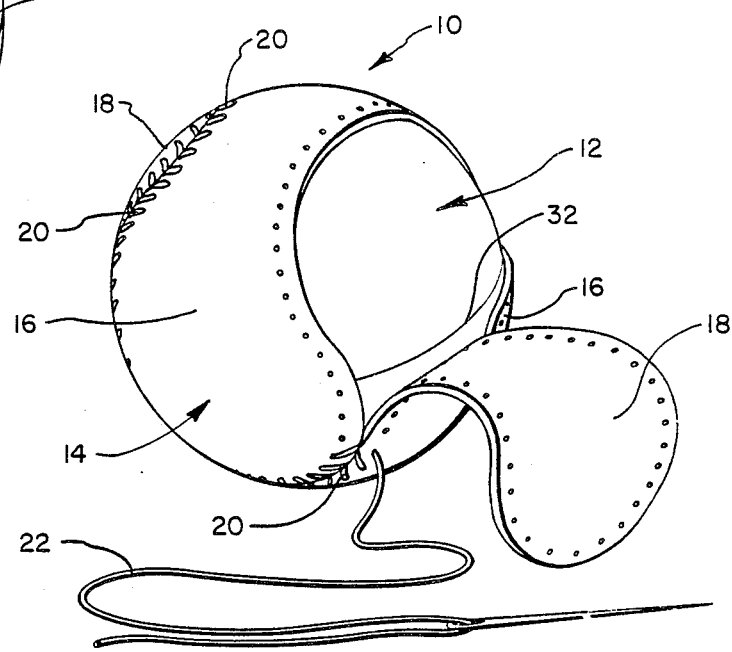
FIG. 2 is a perspective view of one embodiment of the game ball of the present invention in partially disassembled state.

As can be seen by reference to FIGS. 1 and 2 taken together, one embodiment of a game ball 10 according to the present invention can be seen to comprise a resilient spherical core 12 tightly enclosed within a durable cover 14. Cover 14 comprises two pieces 16, 18 of a flat material joined one to another at the edges thereof by stitching 20 using some form of durable thread 22, such as nylon or vinylon.

The cut of pieces 16, 18 of cover 14 is such that the pattern of stitching 20 on the surface of game ball 10 assumes the same pattern as that associated with a standard baseball or softball. In the embodiments of the game ball of the present invention intended for use as a training device in teaching skills associated with the games of baseball and softball, it is considered highly advantageous that the stitching 20 be in a herringbone pattern and that the thickness of the material of cover 14 in combination with the diameter of thread 22 result in ridges of stitching 20 affording a grip and aerodynamic behavior that substantially replicate those of such standard game balls.

In this regard, it is further recommended that the outer surface of pieces 16, 18 of cover 14 be textured so as to resemble the outer surface of the leather covers traditionally employed with standard of baseballs and softballs. While actual leather may be used for this purpose, synthetic leather, such as polyvinyl chloride (PVC) leather, is recommended in lieu thereof, due to the enhanced resistance to wear and moisture such material offers. The integrity of game ball 10 can also be improved through the the bonding of core 14 to cover 12 using any suitable adhesive.

As shown by way of example in FIG. 1, cover 12 is a spherical shell of thickness, T, which may comprise two substantially identical semi-spherical shells 24, 26 suitable joined together into a unitary structure at the circumferential edges 28, 30, respectively thereof, at a bonding seam 32, shown in FIG. 2. Core 12 is preferably formed from a soft flexible, waterproof material.

Where the bonding between semipherical shells 24, 26 is continuous, the interior 34 of core 12 may be pressurized by known means in relation to the ambient atmosphere in order to effect specific desired rebound characteristics in the game ball 10. Nevertheless, desirable performance characteristics are readily obtainable using a core 12 which is not pressurized.

If the game ball of the present invention is intended for use as a substitute for a game ball of standard specification, then those specifications and the thickness of the material to be used for cover 14 will substantially determine the outer diameter required of a corresponding core 12. Nevertheless, even within the constraint of a single predetermined outer diameter, the softness and weight of such a substitute game ball can be varied toward any desired range of values through variation in the thickness, T, of core 12 and the material from which it is fabricated.

While a suitable game ball according to the present invention could be produced using a core 12 made of any number of soft, durable, and waterproof compositions, one rubber-based compound found appropriate for this purpose comprised the components listed in Table 1 below in the quantities shown.

TABLE 1
Constituents of One Embodiment of a Game Ball Core

| Component | Weight pounds | (kilograms) | Percent (by weight) |
|---|---|---|---|
| Styrene butadiene rubber (SBR-1778) | 31.31 | (14.2) | 31.9 |
| Natural Rubber | 17.20 | (7.8) | 17.5 |
| Calcium carbonate (CaCO$_3$) | 34.40 | (15.6) | 35.1 |
| Zinc oxide (ZnO) | 2.87 | (1.3) | 2.9 |
| Silica powder (SiO$_2$) | 6.62 | (3.0) | 6.8 |
| Sulfur (S) | 2.21 | (1.0) | 2.3 |
| Rubber Cure Accelerator | 0.57 | (0.26) | 0.6 |
| Diphenyl Guaniden | 0.68 | (0.31) | 0.7 |
| Steraic Acid | 0.68 | (0.31) | 0.7 |
| Process Oil | 1.01 | (0.46) | 1.0 |
| Pigment | 0.44 | (0.20) | 0.5 |
| TOTAL: | 97.99 | (44.44) | 100.0 |

The above components are mixed by open rolling and kneading and then extruded for curing and processing into finished game ball cores 12 in a process to be described subsequently.

Figure 3:
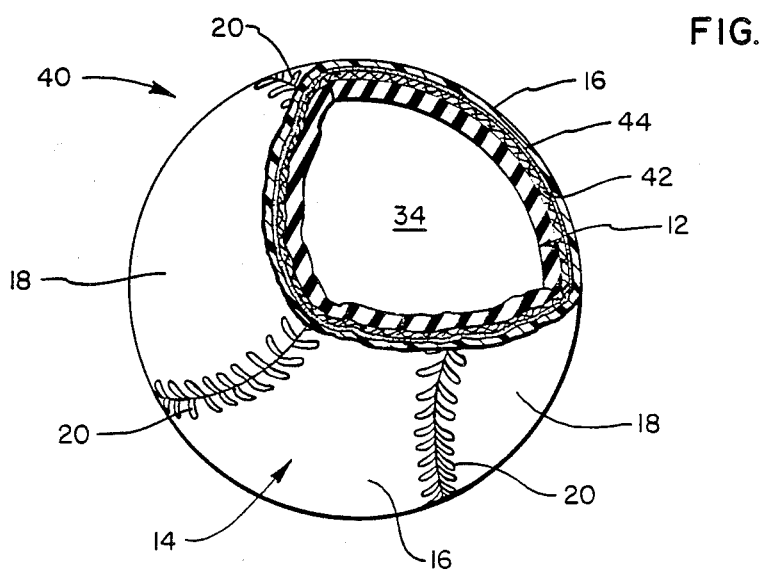
FIG. 3 is a perspective view in partial cross-section of a second embodiment of a game ball according to the present invention.

FIG. 3 depicts a second embodient of a game ball 40 constructed according to the present invention. As in the embodiment already described, game ball 40 comprises a hollow resilient unitary core 12 and a durable outer cover 14 comprised of pieces 16, 18 of a flat material which are joined one to another at the edges thereof by stitching 20. Core 12 is enclosed in a layer of twine 42 tightly wrapped in random fashion about core 12. In relation to a game ball of given predetermined diameter, the use of a layer 42 of twine enhances rigidity and necessitates use of a core 12 of reduced outer diameter in relation to the core required when no longer, such as layer 42, is utilized. In game ball 40, cover 14 may be adhered to layer of twine 42 through use of a suitable adhesive 44, which advantageously can be a waterproof substance. Interior space 34 of core 12 contains air, either under pressure or at ambient conditions.

Figure 4A:
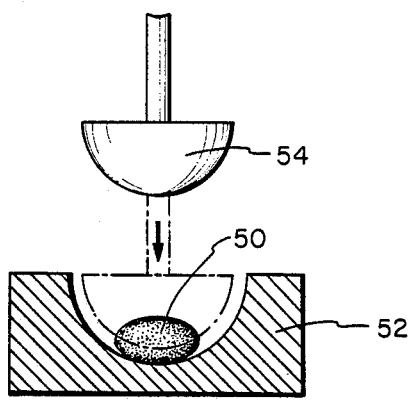
FIG. 4A through FIG. 4E are a sequence of cross-sectional views illustrating one embodiment of a method for manufacturing the hollow spherical core of the game ball of the present invention.
Figure 4B:
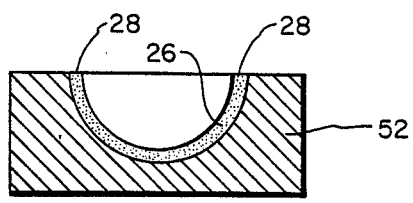
Figure 4C:
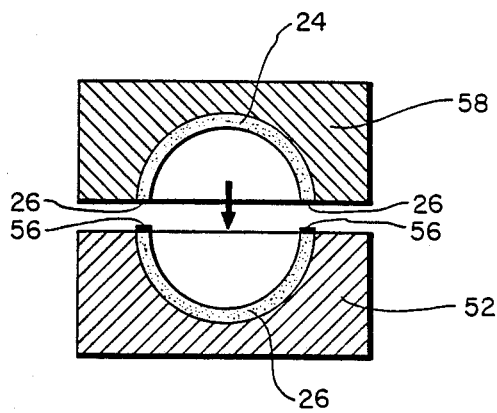

An example of one method for producing a core, such as core 12, for a game ball according to the present invention, will be better understood by reference to the series of diagrams shown in FIGS. 4A through 4E. A bolus 50 of a rubber-based compound, such as that described above, is placed in the bottom of a hemispherical concave mold 52 and is compressed thereagainst by a corresponding convex mold 54 of lesser diameter. This forces bolus 50 to assume the shape of a thin hemispherical shell 26 between molds 52 and 54. The assemblage is heated to a temperature of 293° F. (145° C.) and maintaining for five minutes in order to cure the rubber-based compound comprising bolus 50. Thereafter, convex hemispherical mold 54 is withdrawn leaving a hemispherical shell, 26 resting in concave hemispherical mold 52, as shown in FIG. 4B.

Figure 4D:
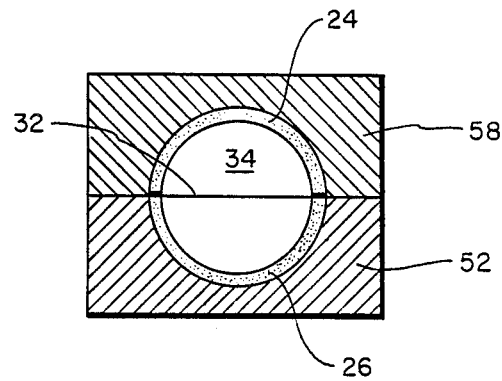
Figure 4E:
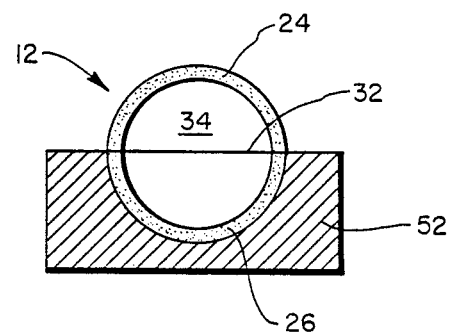

Circumferential edge 28 of hemispherical shell 26 is then steam buffed, and a thin continuous layer of adhesive 56 is applied thereto. A second substantially identical semispherical shell 24 carried in a second substantially identical concave hemispherical mold 58 is pressed against semipherical shell 26 so that circumferential edge 30 of semispherical shell 24 meets circumferential edge 28 of semispherical shell 26 at a pressure of approximately 1425 psi (100 kg/cm$^2$). The assemblage is again heated to a temperature of 293° F. (145° C.) for a period of five minutes in order to cure the bond at seam 32 between semispherical shells 24, 26, as shown in FIG. 4D. Thereafter, concave hemispherical molds 52, 58 are separated and the resulting core 12 is removed for surface buffing and visual inspection prior to further processing.

The physical properties of a group of game balls according to the present invention, sized as substitute baseballs, are compared in Table 2 below with corresponding public domain data regarding the physical characteristics of a regulation baseball, a RAGBALL recreational ball, and an INCREDIBALL game ball.

TABLE 2

| | Game Balls of Regulation Baseball Size 9.0 to 9.25 inch (22.9 to 23.5 cm) Circumference | | | |
|---|---|---|---|---|
| | Regulation Baseball* | RAG BALL Game Ball* | INCREDIBALL Game Ball* | INVENTIVE Game Ball |
| Weight in Ounces and (grams) | 5.0 to 5.25 (143–150) | 2.25 to 2.5 (64–71) | 3.25 to 3.5 (93–100) | 2.81 to 3.18 (80–90) |
| Density in g/cm$^3$ | 0.65 to 0.74 | 0.29 to 0.35 | 0.42 to 0.49 | 0.40 to 0.43 |
| Softness (Type A Durometer) | 85 | 21 to 36 | 32 to 39 | 72 to 77 |
| 'Rebound Percent (from 20 feet onto concrete surface) | 34 | 20 to 23 | 23 to 24 | 24 to 27 |
| Compression | | | | |
| at 500 lbs. | 14.7% | 50% | 63.8% | 77.1% |
| at 1000 lbs. | 22.7% | 56.2% | 68.8% | 82.6% |
| at 1500 lbs. | 28.7% | 58.9% | 71.3% | 84.2% |
| Recovery from 1500 lbs. | | | | |
| at 30 sec. | 91.2% | 80% | 95.6% | 94.8% |

TABLE 2-continued

| | Game Balls of Regulation Baseball Size 9.0 to 9.25 inch (22.9 to 23.5 cm) Circumference | | | |
|---|---|---|---|---|
| | Regulation Baseball* | RAG BALL Game Ball* | INCREDIBALL Game Ball* | INVENTIVE Game Ball |
| at 60 sec. | 92.3% | 82.1% | 96.3% | 95.4% |
| at 90 sec. | 93.0% | 82.8% | 96.8% | 95.7% |
| at 5 min. | 94.1% | 85.2% | 97.7% | 96.0% |
| Construction | | | | |
| Core | Cork & hard rubber, solid | Cloth, solid | Soft urethane foam, solid | Rubber-based compound, hollow |
| Inner Layer | Yarn | Yarn and tape | Tape | Thread (optional) |
| Cover | Leather | Knit polyester | Heavy knit nylon | Synthetic leather (PVC) |

*Data obtained from U.S. Pat. No. 4,462,589

The inventive game balls from which the above data was derived where manufactured from the rubber-based compound specified in Table 1. Each spherical core had a weight in the range of 2.15 to 2.26 ounces (61–64 grams) and had an outer diameter in the range of 2.79 to 2.83 inches (71–72 millimeters). The thickness, T, of the cores ranged from 0.10 to 0.14 inches (2.5–3.5 millimeters).

While the inventive game balls for which data is provided in Table 2 had total weights in the range of 2.81 to 3.18 ounces (80–90 grams), suitable variation in the thickness, T, of core 12 and the compound of which it is fabricated can result in game balls suitable for serving as substitute baseballs in a wide variety of circumstances. For younger players, subsitute baseballs weighing as little as 2.75 ounces (78 grams), or even 2.50 ounces (71 grams), may be appropriate. On the other hand heavier substitute baseballs weighing 3.25 ounces (92 grams), or even 3.50 ounces (99 grams), may be called for by the skill or strength of more experienced or older players. The weight of the inventive game ball can, accordingly, be varied to match precisely the capabilities and strength of the players employing it.

As will be appreciated, the game ball of the present invention can similarly be fabricated so as to replicate the size and a suitable range of weights for any of the several standard sizes of softballs. Furthermore, game balls are entirely conceivable which imitate no otherwise standardized form of game ball. These can be used in their own right as recreational game balls in various sports, existing or yet to be developed.

The unique combination of materials from which the game ball of the present invention is comprised thus result in a highly versatile object that extends the opportunities for the training of players of any degree of experience, age, or strength in the sports of baseball and softball. The game ball of the present invention with its air-cushioned core results in a subsitute game ball of enhanced safety but having a minimal degradation of performance characteristics from the standard. The surface features and texture of the game ball of the present invention faithfully replicate those of the standard ball for which they may be substituted. Therefore, the grip and aerodynamic characteristics of the ball permit users thereof to acquire facility that will eventually permit them to master the sport played with the standard ball therefor. On the other hand, the inventive game ball, in any of its envisioned sizes and weights, is highly durable and resistant to structural or performance degradation due to the absorption of moisture. In other settings, as a substitute for training or learning purposes, the inventive game ball offers valid recreational utility for players in casual or indoor circumstances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A substitute baseball for safely teaching young and inexperienced players the skills developed by playing with an otherwise hard and heavy regulation baseball, the substitute baseball comprising:
    (a) a cover replicating the appearance, texture, and surface features of a regulation baseball, thereby producing in said substitute baseball the feel and aerodynamic behavior of a regulation baseball, said cover comprising:
        (i) first and second pieces of thin material cut in the pattern of the pieces of the cover of a regulation baseball, said first and second pieces having a texture on the outer surface thereof that resembles leather and being provided at the edges thereof with a plurality of perforations in a continuous sequence parallel said edges; and
        (ii) raised herringbone stitching threaded between said perforations on said first piece and said perforations on said second piece, thereby securing the edges of said first piece to said edges of said second piece in a single continuous raised ridge of stitching disposed in the pattern of the stitching of the cover of a standard baseball, said ridge of stitching presenting an elevated gripping feature on the surface of said cover and contributing to aerodynamic behavior in said substitute baseball that replicates the aerodynamic behavior of a regulation baseball; and
    (b) a flexible, hollow spherical core formed of a homogeneous synthetic rubber material and enclosed within said cover, the outer diameter of said core and the thickness of the walls thereof being such that said core with said cover thereon has a weight of 2.50 to 3.50 ounces and a circumference in the range of 9.00 to 9.25 inches, whereby the substitute baseball due to the increased flexibility of the walls thereof and the lightness thereof compared with that of a regulation baseball affords an enhanced margin of safety to young and inexperienced players.

2. A substitute baseball as recited in claim 1, wherein said resilient spherical core comprises two substantially similar, semispherical shells bonded one to the other at the edges thereof.

3. A substitute baseball as recited in claim 1, having a weight in the range of 2.75 to 3.25 ounces.

4. A substitute baseball as recited in claim 3, having a weight in the range of 2.81 to 3.18 ounces.

5. A substitute baseball as recited in claim 1, wherein said cover is bonded to said core using an adhesive.

6. A substitute baseball as recited in claim 1, wherein the air pressure of the interior of said core is greater than the ambient pressure.

7. A substitute baseball as recited in claim 1, further comprising a layer of twine tightly wound in random fashion about said core within said cover.

8. A substitute baseball as recited in claim 1, wherein said first and second pieces of thin material comprise synthetic rubber having a textured surface.

9. A substitute baseball as recited in claim 1, wherein said substitute baseball exhibits a rebound characteristics in the range of approximately 24 to 27 percent when dropped onto a concrete surface from a height of twenty feet.

10. A substitute baseball as recited in claim 1, wherein said material of which said core is formed comprises styrene butadiene rubber, natural rubber, calcium carbonate, and silica powder.

11. A substitute baseball as recited in claim 10, wherein said material from which said core is formed further comprises diphenyl guaniden.

12. A substitute baseball as recited in claim 10, wherein said material from which said core is formed further comprises zinc oxide.

13. A substitute baseball as recited in claim 10, wherein said material from which said core is formed further comprises sulfur.

* * * * *

UNITED STATES PATENT AND TRADEMARK OFFICE
CERTIFICATE OF CORRECTION

PATENT NO. : 4,880,233

DATED : November 14, 1989

INVENTOR(S) : CHUL-HO SONG

It is certified that error appears in the above-identified patent and that said Letters Patent is hereby corrected as shown below:

Column 2, lines 57,59, "baseball of softball" should be --baseball or softball--

Column 5, line 43, "hit with a ball" should be --hit with a bat--

Signed and Sealed this

Nineteenth Day of November, 1991

Attest:

HARRY F. MANBECK, JR.

*Attesting Officer*  *Commissioner of Patents and Trademarks*